April 11, 1950 J. O. SILVEY 2,503,923

TRIPLE TUNED HIGH-FREQUENCY TRANSFORMER

Filed Jan. 2, 1947

Inventor:
John O. Silvey,
by Merton D. Morse
His Attorney.

Patented Apr. 11, 1950

2,503,923

UNITED STATES PATENT OFFICE 2,503,923

TRIPLE TUNED HIGH-FREQUENCY TRANSFORMER

John O. Silvey, Bridgeport, Conn., assignor to General Electric Company, a corporation of New York Application January 2, 1947, Serial No. 719,825

3 Claims. (Cl. 171—119)

My invention relates to television receivers and, in particular, to the high frequency circuits of such a receiver.

It is a primary object of my invention to provide new and improved means for eliminating interference in television receivers which is due to strong frequency modulation broadcast signals.

In television receivers which are to operate over a large number of television channels, it is found that, when the receiver circuits are adjusted for certain channels, the locally generated oscillations in the receiver are of a frequency such that they combine with frequency modulation signals which are likewise received by the antenna of the receiver to produce a beat frequency signal which is of the same frequency as the television receiver intermediate frequency. This is true particularly in the vicinity of a frequency modulation broadcast stage or in regions of strong frequency modulation signals. Accordingly, it is desirable, in a television receiver, to be able to select only the signals of a desired television channel and to suppress all others, including undesired frequency modulation signals.

A further consideration in the construction of a television receiver is the desirability of providing circuits pretuned to the desired television channels and which can be selected rapidly and easily. One way to achieve this result is to have the pretuned high frequency circuits positioned around the circumference of a rotary switch so that a desired one can quickly be selected by rotation of the switch handle. Of course, such an arrangement of pretuned circuits requires that they be as small in size as possible and yet be adjustable so that they can be accurately tuned to receive a desired television channel. Since, so far as the manufacturer is concerned, it is impossible to pretune all of the circuits to meet the desires of a purchaser, it is desirable that such high frequency circuits be capable of adjustment at the place where the receiver is installed.

It is an object of my invention to provide a new and improved high frequency television circuit which is compact in size and which may easily be adjusted to receive a desired television signal.

It is another object of my invention to provide a new and improved transformer which translates high frequency signals over a broad band of frequency and which rejects signals of a frequency outside that band.

It is still another object of my invention to provide a new and improved high frequency transformer in which both the inductance of the component windings and the coupling may be easily and accurately adjusted.

It is a still further object of my invention to provide a new and improved high frequency transformer in which the coupling between the component windings is adjustable after the windings are fixed in position.

It is a further object of my invention to provide a high frequency transformer that is small in size so that it can be mounted on a multiposition band switch.

Figure 1:
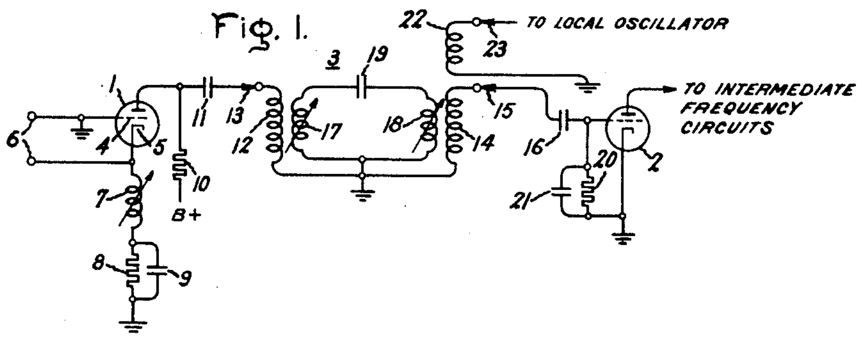
Figure 2:
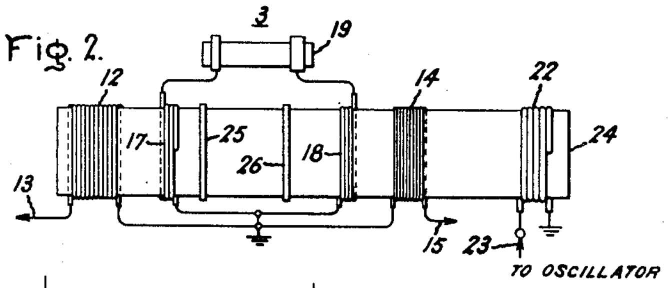
Figure 3:
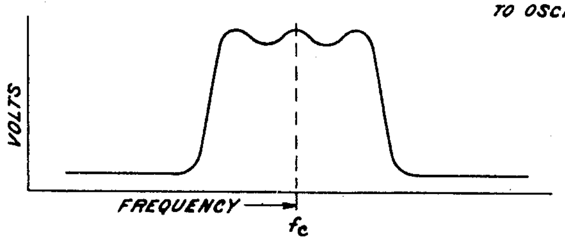
Figure 4:
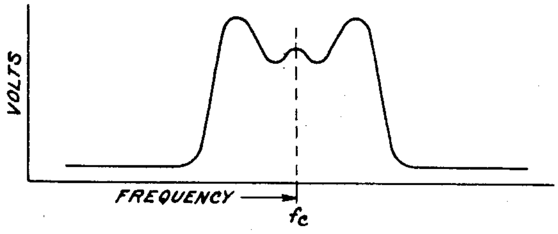
Figure 5:
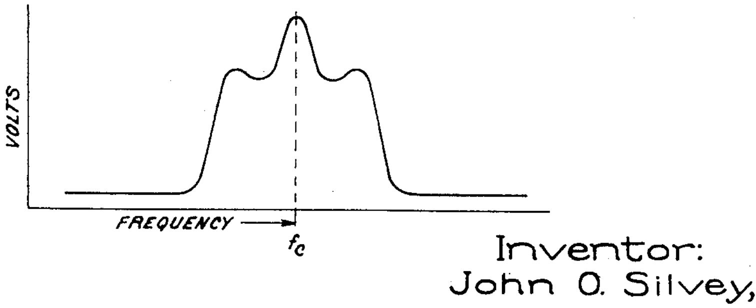

The features of my invention which I believe to be novel are set forth with particularity in the appended claims. My invention itself, however, together with further objects and advantages thereof, may best be understood by reference to the following description taken in connection with the accompanying drawings in which Fig. 1 diagrammatically illustrates a circuit embodying the basic principles of my invention; Fig. 2 is an elevation view of a transformer utilized in the circuit of Fig. 1 and constructed in accordance with my invention; and Figs. 3–5 are curves illustrating certain operational characteristics of the circuit of Fig. 1.

Referring to Fig. 1, I have there shown a portion of the high frequency circuit of a television receiver which comprises a radio frequency amplifier 1 and a converter or mixer tube 2 which are coupled together through a triple tuned transformer 3. The high frequency amplifier 1 comprises an electron discharge device having a control electrode 4, which is connected to ground, and a cathode 5. High frequency television signals received by the usual television antenna (not shown) are impressed between the cathode and control electrode by supplying these signals to the input terminals 6 connected to the control electrode and cathode. The grid-cathode capacitance of amplifier 1, as well as the input capacitance of the transmission line supplying signals to the amplifier 1 is neutralized by means of a variable inductance 7 which has one of its terminals connected to the cathode 5 and its other terminal connected through a resistor 8 to ground. In order to prevent attenuation of a received television signal, the resistor 8 is shunted by a bypass capacitor 9. The anode of the high frequency amplifier 1 is supplied with operating potential from any suitable source indicated by the legend B+ through an anode resistor 10. The anode is likewise coupled through a capacitor 11 to an inductance 12 tuned, in a manner to be explained later, to the frequency of a particular television channel. A multi-band television receiver may include a plurality of such high frequency coils 12 which may be connected in circuit with the high frequency amplifier 1 by means of a multi-position switch 13. The inductance coil 12 comprises the primary winding of the transformer 3 and has its one terminal connected to ground. The secondary winding of the transformer 3 comprises an inductance coil 14 which is connected through a multi-position switch 15, which is mechanically linked to the switch 13 for unicontrol operation, and a coupling capacitor 16 to the control electrode of the converter tube 2. The windings 12, 14 of the high frequency transformer 3 are coupled through a tertiary winding comprising inductance coils 17, 18. The coils 17, 18 are indicated as being adjustable and having their upper terminals coupled together through a capacitor 19 and their lower terminals connected to ground.

The converter tube 2 is illustrated as a triode having its cathode connected to ground and to its control electrode through a grid bias resistor 20 shunted by a capacitor 21. The locally generated oscillations are suplied to the control electrode of the mixer tube 2 by means of an inductance or oscillator coil 22 coupled to the winding 14 from the usual local oscillator (not shown). In a television receiver having a large number of circuits pretuned to desired channels, a separate oscillator coil 22 may be used for each circuit and is connected to the remaining portions of the oscillator circuit through a multi-position switch 23. Preferably, such a switch 23 is arranged with switches 13 and 15 for unicontrol operation. The anode of the mixer tube 2 is indicated as being connected to the usual intermediate frequency circuits.

In Fig. 2, I have shown a side elevation view of a transformer construction I have found particularly useful in a television receiver. The transformer 3 comprises a cylindrical dielectric support 24 upon which are mounted the primary winding or radio frequency coil 12, the secondary winding or converter grid coil 14, the oscillator coil 22, and the tertiary winding comprising the coils 17, 18. All of the coils are arranged in spaced coaxial positions upon the dielectric support 24. Each of the coils has one terminal grounded and the coils 12, 14 and 22 have their other terminals connected, respectively, to the switches 13, 15, and 23. The other terminals of the coils 17, 18 of the tertiary winding of the transformer are connected together through a capacitor 19.

I provide means for tuning the tertiary winding comprising the coils 17, 18, as well as for controlling the coupling or mutual inductance between the tertiary winding and the primary and secondary windings 12, 14. This tuning means comprises metallic rings 25, 26 which encircle the support or coil form 24 and are movable therealong. Preferably, the rings 25, 26 are formed of a good conductive material, such as, for example, copper. By movement of the rings 25, 26 relative to their respective coils 17, 18, I not only tune the tertiary winding of the transformer to resonate at the center frequency of the television channel for which the particular transformer arrangement 3 is to be used, but also control the division of the inductance of the tertiary winding between the coils 17, 18. At the same time, I utilize the tuning means 25, 26 to control the coupling between the radio frequency winding 12 and the tertiary winding and the converter grid coil 14. It may be noted that the tertiary winding is split into two coils which are spaced apart so that greater flexibility of the adjustment of the over-all coupling between the radio frequency circuit of the television receiver and the converter tube circuit is obtained.

In Fig. 3, I have shown the desired frequency characteristic or response curve of the transformer 3 of Fig. 1. It is to be noted that the frequency $f_c$ is the center frequency to which the tertiary winding of the transformer is tuned and which is the center frequency of the television channel for the reception of which a particular transformer 3 is to be employed. Preferably, the transformer has a fairly flat response curve over a band of frequencies equal approximately to 5 megacycles and very low response on either side of that band. Such a characteristic is particularly desired for the suppression of any frequency modulation signals which may be received by the antenna of the television receiver and which might otherwise undesirably mix with the locally generated oscillations of the receiver to produce undesired responses in the intermediate frequency circuits.

As has been pointed out previously, a determinable amount of inductance is required for the tertiary winding to resonate at the center frequency of a particular television channel. This inductance of the tertiary winding may be maintained constant and divided between the coils 17, 18 simply by adjustment of the tuning rings 25, 26. In this fashion, the coupling between the radio frequency winding 12 and the tertiary winding can be varied by movement of the ring 25. Any adjustment of course produces an opposite effect in the coupling between the coil 18 and the converter grid winding 14. Considered in another way, the resistance of the anode circuit of the radio frequency amplifier 1, which is reflected into the tertiary coil 17, is different from that of the converter grid circuit which is reflected into the tertiary coil 18 at any particular frequency. Moving the copper ring 25 with respect to the coil 17 produces, therefore, a greater change in the radio frequency circuit than in the converter grid circuit. As a consequence, it is possible to adjust the rings 25, 26 for a desired coupling characteristic of the transformer circuit, while still maintaining the center frequency constant. By adjustment of the position of the rings 25, 26, therefore, any characteristic or response curve for the transformer 3 may be obtained, such as the curves shown in Figs. 4 and 5 in which the response at the center frequency is respectively decreased and increased with respect to the response at the other points of the pass band of the transformer.

An important advantage of my improved transformer adjustment is that it permits rapid and easy control of the response curve of the coupling transformer. It is well known that mere change of the tubes of a circuit is sufficient to change the reflected resistance of both the radio frequency anode circuit, as well as the converter grid circuit to affect adversely the response curve of the coupling between such circuits. By the use of the transformer arrangement of my invention, an adjustment is provided which permits compensation for the change in coupling due to such a change of reflected resistance.

As pointed out previously, a feature desirable in a television receiver is the use of a plurality of circuits pretuned to desired television channels and which can be selected rapidly and easily. By my invention, a small and compact transformer arrangement is provided which includes all the high frequency coils required for the reception of a particular television channel. The size is such that they may be arranged around the periphery of a rotary switch so that the circuits can be selected rapidly and easily. Thus, it is to be understood that, preferably, a separate transformer of the type of transformer 3, illustrated, is used for each television channel to be received. Thus, I have found that as many as 12 of the transformers 3 may be arranged around the periphery of a small rotary switch in a manner such that, even after the transformers are in position, the response curve of the transformer may be easily adjusted simply by positioning of the rings 25, 26 relative to their associated coils.

While I have shown a particular embodiment of my invention, it is to be understood that I do not wish to be limited thereto, since various modifications may be made and I contemplate by the appended claims to cover all such modifications as fall within the true spirit and scope of my invention.

What I claim as new and desire to secure by Letters Patent of the United States, is,

1. A triple tuned high frequency transformer comprising a tubular coil form, a pair of windings comprising primary and secondary windings supported coaxially and in spaced relation on said form, a third winding supported on said form and comprising a pair of spaced serially connected coils arranged coaxial with and in fixed position between said pair of windings, each of said coils being positioned adjacent a different one of said pair of windings and forming the coupling therebetween, and inductance varying means positioned on said form between said coils for controlling the inductance of said coils and the coupling of said pair of windings, said means comprising an adjustable short-circuited loop conductor movable axially with respect to said coils.

2. A triple tuned high frequency transformer comprising a tubular coil form, a pair of windings comprising primary and secondary windings supported coaxially and in spaced relation on said form, a third winding supported on said form and comprising a pair of spaced serially connected coils arranged coaxial with and in fixed position between said pair of windings, each of said coils being positioned adjacent a different one of said pair of windings and forming the coupling therebetween, and inductance varying means positioned on said form between said coils for controlling the inductance of said coils and the coupling of said pair of windings comprising adjustable metallic rings positioned between said coils for adjusting the distribution of the inductance of said third winding between said coils and the mutual inductance between each of said coils and the one of said pair of windings coupled thereto.

3. A triple tuned high frequency transformer comprising a tubular coil form, a pair of windings comprising primary and secondary windings supported coaxially and in spaced relation on said form, a third winding supported on said form and comprising a pair of spaced serially connected coils arranged coaxial with and in fixed position between said pair of windings, each of said coils being positioned adjacent a different one of said pair of windings and forming the coupling therebetween, and inductance varying means positioned on said form between said coils for controlling the inductance of said coils and the coupling of said pair of windings comprising a pair of metallic rings supported on said form between said coils, each of said rings being positioned adjacent one of said coils and being movable with respect thereto to tune said third winding and adjust the distribution of the inductance of said third winding between said coils.

JOHN O. SILVEY.

REFERENCES CITED

The following references are of record in the file of this patent:

UNITED STATES PATENTS

| Number | Name | Date |
|---|---|---|
| 1,924,553 | Hough | Aug. 29, 1933 |
| 1,954,557 | Comstock | Apr. 10, 1934 |
| 2,018,545 | Case | Oct. 22, 1935 |
| 2,037,614 | Braden | Apr. 14, 1936 |
| 2,054,424 | Johnson | Sept. 15, 1936 |
| 2,140,770 | Schofield | Dec. 20, 1938 |
| 2,187,340 | Wilhelm | Jan. 16, 1940 |
| 2,430,757 | Conrad et al. | Nov. 11, 1947 |